US010442065B2

(12) United States Patent
Schieler et al.

(10) Patent No.: US 10,442,065 B2
(45) Date of Patent: Oct. 15, 2019

(54) STUD MISS INDICATOR FOR FASTENER DRIVING TOOL

(75) Inventors: Bryan Ray Schieler, Palatine, IL (US); Marc David Largo, Gurnee, IL (US)

(73) Assignee: Illinois Tool Works Inc., Glenview, IL (US)

( * ) Notice: Subject to any disclaimer, the term of this patent is extended or adjusted under 35 U.S.C. 154(b) by 887 days.

(21) Appl. No.: 13/463,561

(22) Filed: May 3, 2012

(65) Prior Publication Data

US 2012/0298390 A1    Nov. 29, 2012

Related U.S. Application Data

(60) Provisional application No. 61/488,990, filed on May 23, 2011.

(51) Int. Cl.
| | | |
|---|---|---|
| B25C 1/00 | (2006.01) | |
| B25C 1/04 | (2006.01) | |
| B25C 7/00 | (2006.01) | |
| B25C 1/08 | (2006.01) | |
| B25F 5/00 | (2006.01) | |
| G01P 15/00 | (2006.01) | |

(52) U.S. Cl.
CPC .............. B25C 1/00 (2013.01); B25C 1/008 (2013.01); B25C 1/04 (2013.01); *B25C 1/08* (2013.01); *B25C 1/085* (2013.01); *B25F 5/00* (2013.01); *G01P 15/00* (2013.01)

(58) Field of Classification Search
CPC .. B25C 7/00; B25C 1/008; B25C 1/04; B25C 1/046; B25C 1/00; B25C 1/08; B25F 5/00; G08B 25/002; G08B 13/22; G06F 11/30–34; G05B 2219/14005

USPC .......... 173/20, 6, 82, 182, 2; 227/5; 702/56, 702/141; 340/680
See application file for complete search history.

(56) References Cited

U.S. PATENT DOCUMENTS

| | | | | |
|---|---|---|---|---|
| 4,023,044 A | * | 5/1977 | Miller .................... | B21D 55/00 307/116 |
| 4,207,567 A | * | 6/1980 | Juengel .............. | G05B 19/4065 340/680 |
| 4,339,749 A | * | 7/1982 | Yamada ................. | B21D 55/00 340/679 |
| 4,403,722 A | | 9/1983 | Nikolich | |
| 4,483,473 A | | 11/1984 | Wagdy | |
| 4,483,474 A | | 11/1984 | Nikolich | |
| 4,487,353 A | * | 12/1984 | Benson et al. .................... 227/9 | |
| 4,492,329 A | * | 1/1985 | Benson .................. | B25C 1/008 227/10 |

(Continued)

OTHER PUBLICATIONS

International Search Report issued by the EPO, dated Sep. 19, 2012.

*Primary Examiner* — Alexander M Valvis
*Assistant Examiner* — Eduardo R Ferrero
(74) *Attorney, Agent, or Firm* — Neal, Gerber & Eisenberg LLP

(57) ABSTRACT

A stud miss indicator system for a fastener driving tool includes at least one sensor generating at least one signal based on forces generated by a fastener driving operation, a software program configured for receiving the at least one signal, for evaluating the at least one signal as to a fastener being either improperly driven or properly driven, and the program generating at least one appropriate output signal reflective of the evaluation.

12 Claims, 2 Drawing Sheets

(56) References Cited

U.S. PATENT DOCUMENTS

| | | | | |
|---|---|---|---|---|
| 4,514,724 A * | 4/1985 | Valentine | | F25D 29/008 318/490 |
| 4,514,797 A * | 4/1985 | Begin | | G05B 19/4065 340/680 |
| 4,522,162 A | 6/1985 | Nikolich | | |
| 4,610,381 A * | 9/1986 | Kramer | | B25C 1/005 227/120 |
| RE32,452 E | 7/1987 | Nikolich | | |
| 4,811,883 A * | 3/1989 | Thurner et al. | | 227/10 |
| 4,918,616 A * | 4/1990 | Yoshimura | | G05B 19/4065 340/680 |
| 4,942,387 A * | 7/1990 | Thomas | | G05B 19/4065 340/680 |
| 4,980,844 A * | 12/1990 | Demjanenko | | G01H 1/00 340/680 |
| 4,992,741 A | 2/1991 | Douglas et al. | | |
| 5,197,646 A | 3/1993 | Nikolich | | |
| 5,231,352 A | 7/1993 | Huber | | |
| 5,233,293 A | 8/1993 | Huang et al. | | |
| 5,251,151 A * | 10/1993 | Demjanenko | | G01H 1/00 702/56 |
| 5,263,439 A | 11/1993 | Doherty et al. | | |
| 5,298,889 A * | 3/1994 | Diei | | G01N 29/14 340/680 |
| 5,319,357 A * | 6/1994 | Diei | | G01H 1/003 340/680 |
| 5,480,088 A * | 1/1996 | Braun et al. | | 227/130 |
| 5,517,183 A * | 5/1996 | Bozeman, Jr. | | G01H 1/00 340/669 |
| 5,594,414 A * | 1/1997 | Namngani | | B60Q 9/008 180/168 |
| 5,732,870 A | 3/1998 | Moorman | | |
| 5,914,882 A * | 6/1999 | Yeghiazarians | | F16P 3/00 408/1 R |
| 6,145,724 A | 11/2000 | Shkolnikov et al. | | |
| 6,209,400 B1 * | 4/2001 | Schoch | | B30B 15/28 73/597 |
| 6,297,742 B1 | 10/2001 | Canada et al. | | 340/635 |
| 6,520,397 B1 * | 2/2003 | Moeller | | B25F 5/006 123/46 R |
| 6,607,041 B2 * | 8/2003 | Suzuki et al. | | 173/4 |
| 6,619,527 B1 | 9/2003 | Moeller | | 227/10 |
| 6,796,476 B2 * | 9/2004 | Birk | | B25C 1/008 227/10 |
| 6,808,101 B2 * | 10/2004 | Laubach | | B25C 1/005 227/109 |
| 6,834,559 B1 | 12/2004 | Beebe | | 73/865.8 |
| 6,851,487 B1 * | 2/2005 | Shotey | | B25F 5/00 173/1 |
| 7,182,148 B1 * | 2/2007 | Szieff | | 173/20 |
| 7,193,405 B2 | 3/2007 | Murray | | |
| 7,202,658 B2 | 4/2007 | Ketelaars et al. | | |
| 7,231,303 B2 * | 6/2007 | Griessler et al. | | 702/34 |
| D605,919 S | 12/2009 | Schneider et al. | | |
| 7,734,859 B2 * | 6/2010 | Daniel | | G06F 9/45558 370/466 |
| 7,834,618 B2 | 11/2010 | Moura et al. | | |
| 7,934,566 B2 | 5/2011 | Hlinka et al. | | |
| 8,049,637 B2 * | 11/2011 | Tompkins | | G01M 13/04 173/20 |
| 9,381,635 B2 | 7/2016 | Moore et al. | | |
| 2001/0007420 A1 | 7/2001 | Bijawat et al. | | |
| 2002/0123386 A1 * | 9/2002 | Perlmutter | | A63B 24/0021 473/223 |
| 2003/0024311 A1 * | 2/2003 | Perkins | | A01K 87/00 73/493 |
| 2005/0001000 A1 | 1/2005 | Favre-Bulle et al. | | |
| 2005/0072239 A1 * | 4/2005 | Longsdorf et al. | | 73/649 |
| 2005/0230130 A1 * | 10/2005 | Strasser | | B25F 5/00 173/2 |
| 2006/0065690 A1 * | 3/2006 | Fujisawa | | B25C 1/08 227/10 |
| 2007/0008162 A1 * | 1/2007 | Gossett et al. | | 340/680 |
| 2007/0221697 A1 | 9/2007 | Gschwend | | |
| 2008/0078799 A1 | 4/2008 | Wen | | |
| 2008/0110653 A1 * | 5/2008 | Zhang | | B23D 59/001 173/1 |
| 2008/0236585 A1 * | 10/2008 | Parker | | A61M 16/0078 128/205.23 |
| 2008/0252446 A1 * | 10/2008 | Dammertz | | B25F 5/00 340/539.27 |
| 2008/0288200 A1 * | 11/2008 | Noble | | A61B 5/1116 702/96 |
| 2008/0319570 A1 * | 12/2008 | Van Schoiack | | B23P 19/06 700/110 |
| 2009/0000801 A1 * | 1/2009 | Calvet et al. | | 173/210 |
| 2009/0248326 A1 * | 10/2009 | Greening | | 702/56 |
| 2010/0038394 A1 | 2/2010 | Hlinka et al. | | |
| 2010/0058901 A1 * | 3/2010 | Calloway et al. | | 81/479 |
| 2010/0243699 A1 * | 9/2010 | Largo | | 227/2 |
| 2011/0105955 A1 * | 5/2011 | Yudovsky | | G01P 15/0802 600/595 |
| 2011/0162858 A1 * | 7/2011 | Coste | | G07C 3/08 173/1 |
| 2011/0185864 A1 * | 8/2011 | Ide | | B25B 23/147 81/479 |
| 2011/0186319 A1 * | 8/2011 | Pellenc | | B25F 5/00 173/176 |
| 2012/0083705 A1 * | 4/2012 | Yuen | | A61B 5/0002 600/508 |
| 2012/0146463 A1 * | 6/2012 | Ng | | H05K 1/0292 310/338 |
| 2012/0298390 A1 * | 11/2012 | Schieler et al. | | 173/20 |
| 2013/0127262 A1 * | 5/2013 | Roser | | B23Q 11/0078 307/326 |
| 2013/0133912 A1 * | 5/2013 | Mizuno | | B25B 23/1405 173/180 |
| 2014/0288874 A1 * | 9/2014 | Matsunaga | | A61B 5/1126 702/141 |

* cited by examiner

STUD MISS INDICATOR FOR FASTENER DRIVING TOOL

RELATED APPLICATION

The present application claims priority pursuant to 35 USC 119(e) from U.S. Ser. No. 61/488,990 filed May 23, 2011.

BACKGROUND

The present invention relates generally to fastener driving tools, and particularly to such tools being powered electrically, by compressed gas, combustion or powder.

Combustion-powered tools are known in the art, are also referred to as combustion nailers, and one type of such tools, also known as IMPULSE® brand tools for use in driving fasteners into workpieces, is described in commonly assigned patents to Nikolich U.S. Pat. Re. No. 32,452, and U.S. Pat. Nos. 4,522,162; 4,483,473; 4,483,474; 4,403,722; 5,197,646; 5,263,439 and 6,145,724, all of which are incorporated by reference herein. Similar combustion-powered nail and staple driving tools are available commercially from ITW-Paslode of Vernon Hills, Ill. under the IMPULSE® and PASLODE® brands.

Combustion nailers incorporate a tool housing enclosing a small internal combustion engine. The engine is powered by a canister of pressurized fuel gas, also called a fuel cell. A battery-powered electronic power distribution unit produces a spark for ignition, and a fan located in a combustion chamber provides for both an efficient combustion within the chamber, while facilitating processes ancillary to the combustion operation of the device. Such ancillary processes include: inserting the fuel into the combustion chamber; mixing the fuel and air within the chamber; and removing, or scavenging, combustion by-products. The engine includes a reciprocating piston with an elongated, rigid driver blade disposed within a single cylinder body.

Upon the pulling of a trigger switch, which causes the spark to ignite a charge of gas in the combustion chamber of the engine, the combined piston and driver blade is forced downward to impact a positioned fastener and drive it into the workpiece. The piston then returns to its original, or pre-firing position, through differential gas pressures within the cylinder. Fasteners are fed magazine-style into the nosepiece, where they are held in a properly positioned orientation for receiving the impact of the driver blade.

Other fastener driving tools operate similarly in that a reciprocating driver blade drives fasteners fed to a nosepiece by a biased magazine. The power source varies, with pneumatic, electric and powder operated tools being well known in the art.

Combustion nailers and other types of powered fastener driving tools are used in construction framing, where building panels such as plywood, wallboard, roof sheathing or other construction panels are secured to framing studs with fasteners, typically nails. A common problem for installers is making sure that the fastener is driven into a stud to effectively secure the panel in place. Fasteners not engaging the stud represent a wasted effort, as well as wasted materials, and wasted fuel in the case of the combustion tool.

Many installers employ separate stud finders to facilitate location of the studs, which entails additional effort and inconvenience in carrying and maintaining an extra battery-powered device. Also, the installer cannot always easily see the stud finder's readout while working, and the use of these devices slows production, so professional installers do not typically use separate stud finders. Alternatively, other installers measure the spacing of the studs from a corner or panel edge, often using a chalk line, since studs are conventionally built on 16 inch centers or some other standard depending on the geographic location. However, the latter method is not foolproof, and studs are still missed by driven fasteners.

Also, conventional fastener driving tools are available with built in stud finders. Such devices locate the stud, but do not indicate whether the fastener was properly driven into both the panel and the supporting stud, or improperly, only into the panel. As such, the available techniques for accurately driving fasteners are not consistently accurate, and the problem of misdirected fasteners persists in the context of framing construction.

SUMMARY

The above-listed needs are met or exceeded by the present stud miss indicator for a fastener tool, which preferably features an accelerometer electronically connected to the tool to measure the difference in signals generated respectively when a tool drives a fastener into solid substrate, such as decking fastened to a stud, resulting in a proper fastener application, and also when the fastener is driven into a substrate backed by air. The latter condition occurs when the fastener does not engage the stud, or engages the stud incompletely, resulting in an improper fastener application. A program in the tool analyzes the accelerometer signal and provides a perceptible warning (audible, tactile and/or visual) which indicates to the user whether or not the fastener has been driven into the stud.

More specifically, a stud miss indicator system for a fastener driving tool includes at least one sensor generating at least one signal based on forces generated by a fastener driving operation, a software program configured for receiving the at least one signal, for evaluating the at least one signal as to a fastener being either improperly driven or properly driven, and the program generating at least one appropriate output signal reflective of the evaluation.

In another embodiment, a fastener tool is provided, including at least one sensor configured for sensing the amount of force generated during a fastener driving operation, a processor connected to the at least one sensor and having a software program constructed for evaluating signals generated by the at least one sensor and determining whether the fastener driving operation was favorable or unfavorable, and for generating an appropriate output signal.

DETAILED DESCRIPTION

Figure 1:
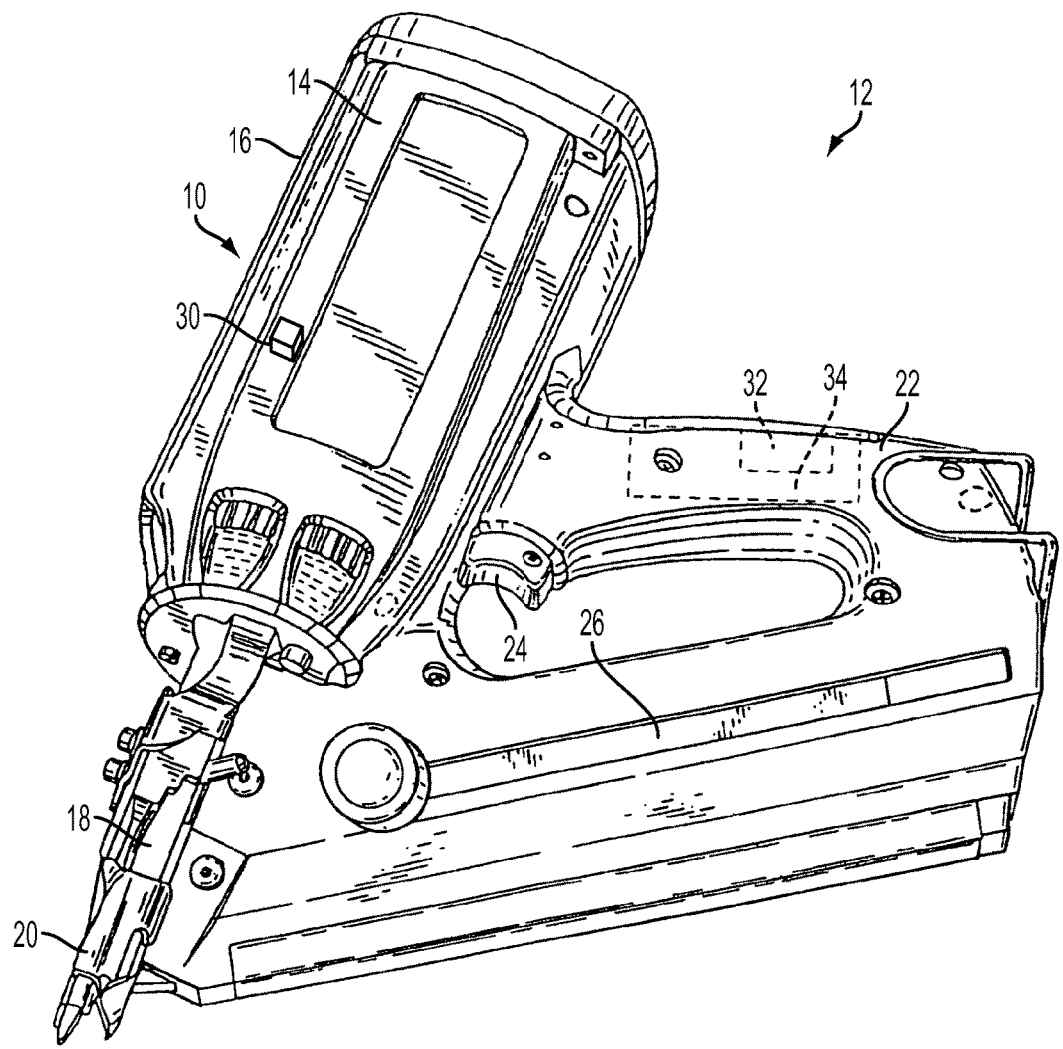
FIG. 1 is a perspective view of a fastener tool suitable for use with the present system.

Referring now to FIG. 1, the present stud miss indicator system 10 is schematically shown mounted to a fastener driving tool or fastener tool, generally designated 12 and constructed according to the general disclosure of the patents incorporated by reference. It will be understood that while the present discussion relates to a depicted combustion tool, the present application is directed to powered fastener driving tools regardless of their power source, and including pneumatic, electrical, powder activated tools and the like.

More specifically, the tool 12 includes a housing 14 defining a power source enclosure 16, and a nosepiece 18 depending from the enclosure and having a vertically reciprocating workpiece contact element 20. The housing 14 also defines a handle 22 with a trigger 24 and a mount for a magazine 26, constructed and arranged for storing a supply of fasteners (not shown) to be urged toward, and driven from, the nosepiece 18.

Figure 2:
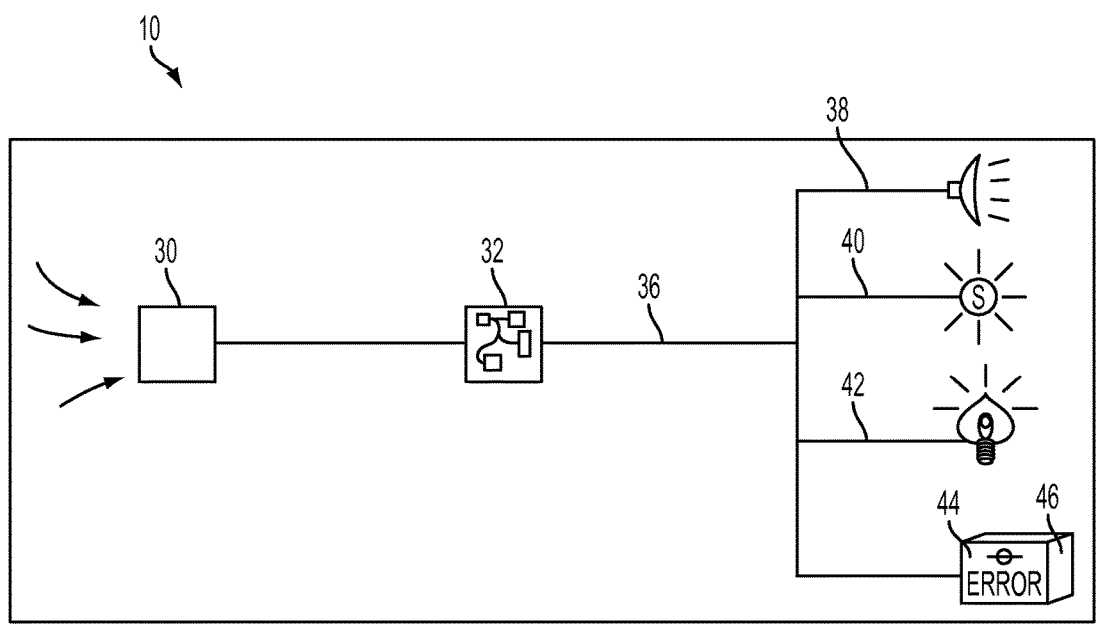
FIG. 2 is a flow chart depicting the present fastener drive sensing system

Referring now to FIGS. 1 and 2, included in the system 10 is at least one sensor 30, preferably an accelerometer or similar sensor conventionally available and capable of sensing shock, impact or other forces such as those generated during a fastener driving operation. The sensor 30 is mounted to the tool 12 at a desired location that is suitable for measuring the impact forces generated in the fastener driving process. Further, the sensor 30 is constructed and arranged for generating at least one signal corresponding to the sensed forces. Presently contemplated mounting locations for the sensor 30 include at least one of the housing 14 on or near the power source enclosure 16, the nosepiece 18, or the magazine 26; however any location is suitable provided that the sensor can properly measure the forces generated during the fastener driving operation.

As seen in FIG. 2, the sensor 30 is connected to a software program 32, incorporated into a programmable microprocessor, other computer chip or the like, which is preferably part of a central processing unit (CPU) 34 constructed and arranged for operating other tool functions, and is conventionally located in the tool handle 22 (FIG. 1). Other locations for the CPU 34 are considered suitable depending on the application. More specifically, the software program 32 is programmed for receiving the at least one signal generated by the sensor 30 and for evaluating and distinguishing those signals between high (improperly driven fastener), versus low (properly driven) "g" forces generated during the fastener driving operation. An appropriate output signal is generated by the software program 32 that is reflective of the evaluation of the sensor signals. When the fastener is improperly driven, the tool 12 absorbs excess energy produced by the driving function which is not absorbed in the course of driving the fastener into the workpiece. This excess energy results in greater "g" force readings.

Once the program 32 determines the type of signal (high or low "g" forces), an output or alarm signal is generated from an output 36 of the microprocessor 34 and is connected to an indicating device, preferably, at least one of an audible alarm 38, a vibrating device 40, a visual indicator 42 such as an illuminated light or an LED, or a visual display 44 on a screen 46 located on the tool 12.

It is contemplated that the software program 32 is configured such that the output is generated both when the impact sensor signal data is favorable or low (fastener properly driven) as well as unfavorable or high (fastener improperly driven), and different types of alarm or indicator signals are triggered depending on the nature of the output signal. For example, a first color such as a green visual indicator 42 is illuminated when the signal data is favorable, and a second, distinct color such as a red indicator is illuminated when the signal data is unfavorable. Naturally, the particular colors may vary to suit the situation. Different audible alarms 38, vibrating alarm pulses 40, and visual display messages 44 are also contemplated depending on whether the signal is indicative of a favorable or an unfavorable fastener driving operation. Alternatively, the program 32 is configured such that the output 36 is generated to trigger an indication such as an alarm (visual, audible and/or tactile) only when the impact signal is interpreted to be unfavorable (fastener is improperly driven).

Thus, by using the present stud miss indicator system 10, an operator of a fastener driving tool can more efficiently determine whether or not a fastener was properly driven into the immediate workpiece, such as a plywood board or structural panel and into an underlying stud. If the system indicates that a stud was missed, the user can rapidly correct the error by correctly driving a supplemental fastener.

While a particular embodiment of the stud miss indicator for fastener driving tool has been described herein, it will be appreciated by those skilled in the art that changes and modifications may be made thereto without departing from the invention in its broader aspects and as set forth in the following claims.

What is claimed:

1. A stud miss indicator system for a fastener driving tool, the stud miss indicator system comprising: at least one sensor electronically connected to the fastener driving tool and physically connected to the fastener driving tool at a location that enables the at least one sensor to sense and generate at least one electrical sensor output signal based on impact forces generated by a fastener driving operation of the fastener driving tool, the fastener driving operation including applying an impact force along a longitudinal axis of a fastener; and a processor communicatively connected to said at least one sensor to receive the at least one electrical sensor output signal, the processor configured to:

(1) evaluate the at least one electrical sensor output signal to distinguish between an improperly driven fastener and a properly driven fastener;

(2) if a fastener was properly driven during the fastener driving operation, generate a first electrical processor output signal, and send the first electrical processor output signal to an indicating device to control the indicating device to output a first indication; and (3) if the fastener was improperly driven during the fastener driving operation, generate a second electrical processor output signal, and send the second electrical processor output signal to the indicating device to control the indicating device to output a second indication different from the first indication, wherein the second indication comprises two or more of an audible output, a visual output, and a vibratory output, and wherein the fastener driving tool is operative regardless of whether the fastener was improperly driven or properly driven.

2. The stud miss indicator system of claim 1, wherein said at least one sensor includes an accelerometer.

3. The stud miss indicator system of claim 1 wherein the indicating device includes at least one of a buzzer and a bicolor light, said bicolor light being at least one of illuminated and projected on a display.

4. The stud miss indicator system of claim 1, wherein the first indication comprises a visual output.

5. The stud miss indicator system of claim 1, wherein the second indication comprises all three of the audible output, the visual output, and the vibratory output.

6. The stud miss indicator system of claim 1, wherein the first indication comprises a visual output, and wherein the second indication comprises all three of the audible output, visual output, and vibratory output.

7. A fastener driving tool comprising:

an indicating device configured to output a first indication and a second indication different from the first indication;

an accelerometer positioned and configured to sense an amount of impact forces generated during a fastener driving operation of the fastener driving tool and to generate at least one electrical accelerometer output signal based on the sensed impact forces, the fastener driving operation including applying an impact force along a longitudinal axis of the fastener;

a processor communicatively connected to the accelerometer to receive the at least one electrical accelerometer output signal and communicatively connected to the indicating device, the processor configured to:

(1) distinguish, based on the at least one electrical accelerometer output signal, between an improperly driven fastener and a properly driven fastener;

(2) if the fastener was properly driven during the fastener driving operation, generate a first electrical processor output signal, and send the first electrical processor output signal to the indicating device to control the indicating device to output the first indication; and (3) if the fastener was improperly driven, generate a second different electrical processor output signal, and send the second electrical processor output signal to the indicating device to control the indicating device to output a second indication different from the first indication, wherein the second indication comprises two or more of an audible output, a visual output, and a vibratory output.

8. The fastener driving tool of claim 7 wherein the tool is operative regardless of whether the fastener was improperly driven or properly driven during the fastener driving operation.

9. The fastener driving tool of claim 7, wherein the first indication comprises a visual output.

10. The fastener driving tool of claim 7, wherein the second indication comprises all three of the audible output, the visual output, and the vibratory output.

11. The fastener driving tool of claim 7, wherein the first indication comprises a visual output, and wherein the second indication comprises all three of the audible output, the visual output, and the vibratory output.

12. A fastener driving tool comprising:
a housing defining a combustion chamber;
a trigger supported by the housing;
a cylinder within the housing adjacent the combustion chamber;
a reciprocatable piston slidably disposed within the cylinder;
a driver blade extending from the piston;
a nosepiece connected to the housing;
a magazine sized to hold fasteners and positioned relative to the nosepiece to feed fasteners into the nosepiece;
an internal combustion engine within the housing and configured to, responsive to actuation of the trigger, ignite combustible material in the combustion chamber to initiate a fastener driving operation and cause the piston to move to drive a fastener out of the nosepiece;
a first light supported by the housing;
a second light supported by the housing;
an audible alarm supported by the housing;
a vibrating device supported by the housing;
an accelerometer positioned and configured to sense an amount of force generated during each fastener driving operation and to generate an electrical accelerometer output signal based on the sensed forces; and
a processor communicatively connected to the accelerometer, the first light, and the second light, the processor configured to receive the electrical accelerometer output signal and:
(1) distinguish, based on the electrical accelerometer output signal, between an improperly driven fastener and a properly driven fastener;
(2) responsive to determining the fastener was properly driven, generate and send a first electrical processor output signal to the first light to activate the first light; and
(3) responsive to determining the fastener was improperly driven, generate and send a second electrical processor output signal to (i) the second light to activate the second light, (ii) the audible alarm to activate an audio output, and (iii) the vibrating device to activate a vibratory output.

* * * * *